United States Patent [19]

Hattori et al.

[11] Patent Number: 5,118,518

[45] Date of Patent: Jun. 2, 1992

[54] METHOD FOR MANUFACTURING SWEET POTATO CHIPS

[75] Inventors: Ryuichi Hattori, Kyoto; Rika Inoue, Hofu, both of Japan

[73] Assignee: House Food Industrial Co., Ltd., Higashiosaka, Japan

[21] Appl. No.: 370,765

[22] Filed: Jun. 23, 1989

[30] Foreign Application Priority Data

Jun. 24, 1988 [JP] Japan ................... 63-156330

[51] Int. Cl.$^5$ .............................................. A23L 1/217
[52] U.S. Cl. .................................. 426/441; 426/445; 426/506; 426/509; 426/510; 426/511; 426/808
[58] Field of Search .............. 426/438, 441, 637, 445, 426/506, 509, 510, 511, 808

[56] References Cited

U.S. PATENT DOCUMENTS

| | | | |
|---|---|---|---|
| 3,394,012 | 7/1968 | Koltun et al | 426/637 |
| 3,574,643 | 4/1971 | Lewis | 426/637 |
| 3,669,686 | 6/1972 | Schoch | 426/419 |
| 4,228,196 | 10/1980 | Weaver et al. | 426/441 |

FOREIGN PATENT DOCUMENTS

| | | |
|---|---|---|
| 806128 | 2/1969 | Canada . |
| 55-15701 | 2/1980 | Japan . |
| 55-135566 | 10/1980 | Japan . |
| 60-172269 | 9/1985 | Japan . |
| 61-31061 | 2/1986 | Japan . |
| 61-152258 | 7/1986 | Japan . |
| 62-91159 | 4/1987 | Japan . |
| 62-91160 | 4/1987 | Japan . |
| 2197175 | 5/1988 | United Kingdom . |

OTHER PUBLICATIONS

Precooked Dehydrated Sweetpotato Flakes, Food Engineering 7/61 reprint.

*Primary Examiner*—Arthur L. Corbin
*Attorney, Agent, or Firm*—Oblon, Spivak, McClelland, Maier & Neustadt

[57] ABSTRACT

A method for manufacturing starting material for dried sweet potato chips comprises heating raw sweet potatoes at a temperature ranging from 70° to 100° C. for 180 to 8 minutes to adjust hardness of the sweet potatoes to 1,800 to 12,000 and then slicing the heated sweet potatoes to a desired thickness. The sweet potato slices are further subjected to a second heat treatment to convert starches present therein to $\alpha$-starches and then dried as such or after freezing to obtain dried sweet potato chips edible as a snack food.

12 Claims, No Drawings

METHOD FOR MANUFACTURING SWEET POTATO CHIPS

BACKGROUND OF THE INVENTION

1. Field of the Invention

The present invention relates to a method for manufacturing dried sweet potato chips which are edible as a snack food and their starting sweet potato chips, in particular extremely thin sweet potato chips having a thickness on the order of 0.3 to 1 mm.

2. Prior Art

Up to now the only chip-type snack food has been widely marketed is the potato chip made from sliced potato. Recently, however, attempts have been made to market sweet potato chips as a snack food. For instance, in Japanese Patent Un-examined Publication (hereinafter referred to as "J. P. KOKAI") No. Sho 55-15701, there is disclosed a method for producing sweet potato chips which comprises slicing sweet potatoes to a thickness of about 2 mm, heat-treating the sliced sweet potato, then freezing it, and frying the sliced and frozen sweet potato as such or after thawing. In addition, methods in which sweet potatoes are sliced to a thickness of about 2 mm (J. P. KOKAI No. Sho 59-31668) or a thickness on the order of 0.5 to 5 mm (J. P. KOKAI No. Sho 60-172269) and then fried to obtain sweet potato chips are also known. Moreover, there have also been known a method for manufacturing sweet potato chips which comprises slicing sweet potatoes to a thickness on the order of 3 to 4 mm, frying the sliced sweet potato to heat up the same and then freezing them (see J. P. KOKAI No. Sho 62-91159) and a method for producing sweet potato chips which comprises slicing sweet potatoes, immersing the sliced sweet potato in a solution of, for instance, a carbonate, and then frying the same (see J. P. KOKAI No. Sho 62-91160).

In general, the most suitable cooking temperature for bringing out the sweetness specific to sweet potato ranges from 60° to 80° C. However, in the aforesaid methods, raw sweet potatoes are first sliced and then subjected to a heat treatment such as a frying and, therefore, these treatments rapidly pass through such temperature range required for developing optimum sweetness of sweet potato. This results in the formation of sweet potato chips having insufficient sweetness. Moreover, to sufficiently develop the sweetness of the sweet potato it is considered that the sweet potato should first be sufficiently steamed and then sliced, but it is difficult to slice steamed sweet potato to a desired thinness and thus sweet potato chips having a desired thickness on the order of 1 mm or less cannot be obtained.

SUMMARY OF THE INVENTION

Accordingly, an object of the present invention is to provide a method for producing starting sweet potato chips which can exhibit sufficient sweetness specific to sweet potato and which have been sliced to a sufficiently thin thickness on the order of about 1 mm or less.

Another object of the present invention is to provide dried sweet potato chips obtained from the foregoing starting sweet potato chips.

The present invention has been completed on the basis of the discovery that sweet potato chips having sufficient sweetness and an extremely thin thickness can be obtained by subjecting harvested raw sweet potatoes to weak heat treatment so as to adjust the softness of sweet potatoes to an extent lower than that achieved by steaming, then slicing the heat-treated sweet potatoes and subjecting the sliced sweet potato to a heat-treatment corresponding to steaming.

Consequently, the present invention provides a method for manufacturing starting material for dried sweet potato chips (referred to as "starting sweet potato chips" in this specification) which comprises heating raw sweet potatoes at a temperature ranging from 70° to 100° C. for 180 to 8 minutes (primary heat-treatment) to adjust the hardness of the sweet potato to 1,800 to 12,000 and then slicing the heated sweet potato to a desired thickness.

According to another aspect of the present invention, there is provided a method for manufacturing dried sweet potato chips which comprises subjecting the foregoing sliced sweet potato chips (starting sweet potato chips) to a further heat-treatment (secondary heat-treatment) to convert starches present in the chips to $\alpha$-starches (gelatinized starches) and then drying the secondary heat treated sweet potato chips as such or after freezing.

DETAILED EXPLANATION OF THE INVENTION

In the method of the present invention, harvested sweet potatoes can be used as raw materials after washing with water, with or without optional peeling.

In the method of the present invention, the aforementioned raw unprocessed sweet potatoes are first subjected to weak heat-treatment so as to adjust the softness of raw sweet potato to an extent lower than that achieved by steaming, namely, a primary heat treatment. More specifically, the raw sweet potato is heated at 70° to 100° C. for 180 to 8 minutes to thus control the hardness of the sweet potato to 1,800 to 12,000. The hardness is measured by the method explained hereinafter. This heat treatment is performed for the purposes of enhancing the activity of $\beta$-amylase present in a sweet potato to increase the amount of maltose produced and to thus sufficiently bring out the sweetness specific to a sweet potato and allowing for the sweet potato to be sliced to a sufficiently thin thickness on the order of 0.3 to 1 mm. In this respect, the primary heat-treatment is preferably carried out by hot water immersion and steam cooking techniques.

The hot water immersion can be performed by immersing raw sweet potatoes in hot water maintained at 70° to 100° C. for 180 to 8 minutes and preferably in hot water of 80° C. for about 60 minutes. At this stage, the blackening of the skin of the sweet potato can be prevented if an organic carboxylic acid such as citric acid, phytic acid, malic acid or lactic acid, which may be used individually or in combination, is added to the hot water in an amount ranging from 0.05 to 0.2% by weight.

When the primary heat treatment is carried out according to a steam cooking technique, it is preferably performed at a temperature ranging from 90° to 100° C. for 60 to 8 minutes and in particular at a temperature of 90° C. for 40 to 60 minutes or at 100° C. for 8 to 10 minutes.

In the method of this invention, the primary heat-treatment explained above is for adjusting the hardness of the raw sweet potato to 1,800 to 12,000. In general, raw sweet potato has a hardness of not less than about 45,000. However, if the hardness thereof can be reduced to not more than 12,000, the sweetness of the sweet potato can be sufficiently brought out and the sweet potato can be sliced to a thickness on the order of about 0.3 mm. On the other hand, if the hardness thereof is adjusted to not less than 1,800, the processed sweet potato can be sliced to a thickness of not more than 1 mm. Moreover, if the hardness of the sweet potato is controlled to 5,000 to 7,000, it is possible to reduce the thickness of the sliced sweet potato even to 0.5 to 0.7 mm.

The term "hardness" herein used means an absolute value of the area (mm$^2$) obtained by determining cutting stress of a plunger of an NRM-2010 J-CW type RHEO meter (available from FUDO INDUSTRIES CO., LTD.) which is recorded on a chart and observed when sweet potato pieces having 8 mm in thickness, 20 mm in width and 40 mm in length are cut under conditions of a chart speed of 120 cm/min; chart full scale of 1 kg (25 cm); plunger speed of 20 cm/min; head scale of 1 kg; blade for cutting being of double-edge, the length of the blade being 35 mm, the width of the blade being 0.36 mm and the angle of its apex being 20°.

In the method of the present invention, the sweet potato having the hardness defined above can be sliced to a desired thickness preferably ranging from 0.3 to 1 mm, more preferably 0.5 to 0.7 mm in an ordinary manner to thus obtain starting sweet potato chips.

In the method of this invention, the starting sweet potato chips thus produced are subsequently subjected to heat-treatment corresponding to steam cooking (secondary heat-treatment) to sufficiently convert the starches present in the starting sweet potato chips to gelatinized starches, preferably to approximately completely convert the starches to gelatinized starches, whereby the sweet potato chips become edible. This secondary heat-treatment is generally carried out at a temperature ranging from 90° to 100° C. for 20 to 5 minutes, particularly at a temperature of 100° C. for about 10 minutes. In other words, starches present in the sweet potato chips can be easily converted to gelatinized starches by the heat treatment for such a short time period since the sweet potato chips is sliced to a sufficiently thin thickness.

In the method of this invention, the sweet potato chips thus obtained are dried as such or after freezing. If the sweet potato chips are frozen at this stage, ice crystals are formed within the chips and the ice crystals are evapoprated during the subsequent drying process, leaving voids in the chips. Thus dried sweet potato chips which are firm and crisp can be obtained.

In the present invention, the preferred drying process is frying or a puffing process such as an explosive puff drying technique which may be performed in the usually manner. In particular, frying under a reduced pressure can be carried out at a low temperature so that browning and discoloration of the chips can be prevented, while the loss of nutritive substances present in the chips and the oxidation of oils and fats used in the frying can also be effectively prevented. The frying under a reduced pressure can be performed, for instance, at a temperature of 90° to 110° C., under a reduced pressure (10 to 100 Torr) for 20 to 5 minutes.

The dried chips obtained by the foregoing procedures are edible as a snack food having sweetness specific to the sweet potato. If desired, a sugar solution can be applied to the chips to further enhance the sweetness thereof.

The method of the present invention makes it possible to sufficiently develop the sweetness specific to the sweet potato and to easily produce very thin starting sweet potato chips and dried chips.

Therefore, the dried sweet potato chips obtained by the method of the present invention can widely been used as a snack food.

The present invention will now be explained in more detail with reference to the following non-limitative working Examples and the effects practically achieved by the method of this invention will also be discussed with reference to Comparative Examples.

EXAMPLE 1

300 g of freshly harvested sweet potatoes (hardness: 62,000) having a maximum diameter of about 5 cm and a length of 20 cm were washed with water, immersed in hot water maintained at 80° C. for 60 minutes to control the hardness thereof to 9,200 and sliced to a thickness of 0.42 mm with a slicer (available from NANTSUNE TEKKO CO., LTD. under the trade name of HB-2).

EXAMPLE 2

Starting sweet potato chips having a thickness of 0.45 mm were produced in the same manner as in Example 1 except that the sweet potatoes were steam-cooked at 80° C. for 50 minutes instead of immersing in hot water of 80° C. for 60 minutes.

COMPARATIVE EXAMPLE 1

Starting sweet potato chips were produced by slicing the raw sweet potatoes used in Example 1 to a thickness of 0.32 mm and the properties thereof were examined.

COMPARATIVE EXAMPLES 2 TO 4

Starting sweet potato chips were produced in the same manner as in Example 1 except that different heat treatment conditions were used in each Comparative Example.

The results obtained in Examples 1 and 2 are listed in Table I together with those obtained in the Comparative Examples.

TABLE I

| Ex. No. | Processing Method | Temp. (°C.) | Processing time | Hardness |
|---|---|---|---|---|
| Example | | | | |
| 1 | Hot Water Immersion | 80 | 60 min. | 9,200 |
| 2 | Steam Cooking | 80 | 50 min. | 6,800 |
| Comp. Ex. | | | | |
| 1 | Unprocessed | — | — | 62,000 |
| 2 | Hot Water Immersion | 80 | 20 min. | 24,000 |
| 3 | Steam Cooking | 100 | 30 min. | 1,700 |
| 4 | Steam Cooking and Oven Treatment* | 100 150 | 30 min. 30 min. | 1,400 |

| Ex. No. | Width of Slice(mm) | Content of Maltose(%) | Browning |
|---|---|---|---|
| Example | | | |
| 1 | 0.42 | 32.5 | none |
| 2 | 0.45 | 27.7 | none |
| Comp. Ex. | | | |
| 1 | 0.32 | 0.0 | strong |
| 2 | 0.40 | 11.9 | strong |
| 3 | 1.1 | 28.6 | none |
| 4 | 1.5 | 36.7 | none |

*After steam cooking, the sweet potatoes were treated in an oven (150° C. for 30 minutes).

EXAMPLE 3

The starting sweet potato chips produced in Example 1 were steam cooked at 100° C. for 10 minutes, followed by freezing at −40° C. for 30 minutes, whereafter 70 g of the frozen sweet potato chips were fried under a reduced pressure at 100° C., 10 Torr for 10 minutes and then drained of oil to obtain dried sweet potato chips whose sweetness was sufficiently developed and which were firm and crisp.

EXAMPLE 4

Dried sweet potato chips were produced in the same manner as in Example 3 except that the heat treated sweet potato chips were not subjected to freezing process.

EXAMPLE 5

Dried sweet potato chips were produced in the same manner as in Example 3 except that the starting sweet potato chips obtained in Example 2 were used.

EXAMPLE 6

Dried sweet potato chips were produced in the same manner as in Example 5 except that the heat treated sweet potato chips were not subjected to freezing process.

COMPARATIVE EXAMPLES 5 TO 8

Dried sweet potato chips were produced in the same manner as in Example 3 except that the starting sweet potato chips obtained in Comparative Examples 1 to 4 were used.

Properties of the dried sweet potato chips obtained in Examples 3 to 6 and Comparative Examples 5 to 8 are summarized in Table II. In Table II, taste and texture, sweetness and browning are the average of the evaluation of 17 panelists using the following standard.

Taste and Texture
  5: Crisp and tender
  3: Crispy but tough
  1: Crunchy and tough
Sweetness
  5: Strong
  3: Moderate
  1: Low
Browning
  5: No browning
  3: Slight browning
  1: Intense browning

TABLE II

| Ex. No. | Conditions | Taste & Texture | Sweetness | Browning |
|---|---|---|---|---|
| Examples | | | | |
| 3 | Hot water immersion at 80° C. for 60 min. | 5.0 | 5.0 | 5.0 |
| 4 | Hot water immersion at 80° C. for 60 min.; no freezing | 3.5 | 3.6 | 3.4 |
| 5 | Steam cooking at 80° C. for 50 min. | 3.9 | 4.2 | 4.6 |
| 6 | Steam cooking at 80° C. for 50 min.; no freezing | 3.0 | 4.1 | 4.6 |
| Comp. Exs. | | | | |
| 5 | Un-processed | 4.5 | 1.6 | 1.4 |
| 6 | Hot water immersion at 80° C. for 20 min. | 4.1 | 2.9 | 1.4 |
| 7 | Steam cooking at 100° C. for 30 min. | 1.4 | 4.8 | 3.6 |
| 8 | Steam cooking and Oven treatment | 1.1 | 4.6 | 3.7 |

As seen from the results in Table II, if the sweet potato chips were subjected to freezing treatment prior to drying, the resulting dried sweet potato chips were excellent in taste and texture and exhibited hardly any browning (see the results obtained in Examples 3 and 5).

EXAMPLE 7

Sweet potato chips having a thickness of 0.42 mm were produced in the same manner as in Example 1 except that the potatoes were immersed in hot water containing 0.07% by weight of citric acid and having a pH of 3.0, instead of being immersed in hot water.

The color of the surface of the thus obtained sweet potato chips was bright red similar to the red surface of the potatoes before immersion in the hot water.

The thus obtained sweet potato chips were steam cooked at 100° C. for 10 minutes, followed by freezing at −40° C. for 60 minutes, after which 100 g of the frozen sweet potato chips were fried at 100° C. under a reduced pressure of 100 Torr for 15 minutes and then drained of oil to obtain dried sweet potato chips.

Almost no black spots were observed on the surface of the dried sweet potato chips and the color of the surface thereof was very similar to that of the potatoes which had not been immersed in the hot water.

What is claimed is:

1. A method for manufacturing dried sweet potato chips comprising the steps of heating raw sweet potatoes at a temperature ranging from 70° to 100° C. for 180 to 8 minutes to adjust the hardness of the sweet potatoes to 1,800 to 12,000, slicing the heated sweet potatoes to a thickness of 0.3 to 1 mm, subjecting the resultant sweet potato slices to a second heat treatment to convert starches present in the sweet potato slices to α-starches and then drying the heat treated sweet potato slices as such or after freezing.

2. The method of claim 1 wherein the hardness of the heated sweet potatoes is controlled to 5,000 to 7,000.

3. The method of claim 2 wherein the thickness of the sweet potato chips ranges from 0.5 to 0.7 mm.

4. The method of claim 1 wherein the raw sweet potatoes are heated by immersing them in hot water maintained at 70° to 100° C. for 180 to 10 minutes.

5. The method of claim 4 wherein the hot water contains 0.05 to 0.2% by weight of an organic carboxylic acid.

6. The method of claim 5 wherein the organic carboxylic acid is selected from the group consisting of citric acid, phytic acid, malic acid and lactic acid.

7. The method of claim 4 wherein the raw sweet potatoes are heated by immersing them in hot water maintained at 80° C. for about 60 minutes.

8. The method of claim 1 wherein the raw sweet potatoes are heated by steam cooking at a temperature of 90° to 100° C. for 60 to 8 minutes.

9. The method of claim 1 wherein the second heat treatment is performed at a temperature of 90° to 100° C. for 20 to 5 minutes.

10. The method of claim 9 wherein the second heat treatment is performed at a temperature of 100° C. for about 10 minutes.

11. The method of claim 1 wherein the drying occurs by frying or explosive puff drying.

12. The method of claim 11 wherein the frying is performed at a temperature ranging from 90° to 110° C. for 20 to 5 minutes under a reduced pressure of 10 to 100 Torr.

* * * * *